United States Patent
Ishii et al.

(10) Patent No.: US 11,181,627 B2
(45) Date of Patent: Nov. 23, 2021

(54) ULTRASONIC SENSOR

(71) Applicant: DENSO CORPORATION, Kariya (JP)

(72) Inventors: Itaru Ishii, Kariya (JP); Tomoki Tanemura, Kariya (JP); Tatsuya Kamiya, Kariya (JP)

(73) Assignee: DENSO CORPORATION, Kariya (JP)

( * ) Notice: Subject to any disclaimer, the term of this patent is extended or adjusted under 35 U.S.C. 154(b) by 339 days.

(21) Appl. No.: 16/261,808

(22) Filed: Jan. 30, 2019

(65) Prior Publication Data

US 2019/0242985 A1 Aug. 8, 2019

(30) Foreign Application Priority Data

Feb. 5, 2018 (JP) .............................. JP2018-018530
Jan. 10, 2019 (JP) .............................. JP2019-002914

(51) Int. Cl.
*G01S 7/521* (2006.01)
*G01S 15/931* (2020.01)

(52) U.S. Cl.
CPC .............. *G01S 7/521* (2013.01); *G01S 15/931* (2013.01); *G01S 2015/938* (2013.01)

(58) Field of Classification Search
CPC ... G01S 7/521; G01S 15/931; G01S 2015/938
See application file for complete search history.

(56) References Cited

U.S. PATENT DOCUMENTS 6,710,302 B1 * 3/2004 Rennick ................. G01S 15/04
219/202
7,732,987 B2 * 6/2010 Gao ....................... B06B 1/0622
310/328
(Continued)

FOREIGN PATENT DOCUMENTS

CN 102798852 A * 11/2012 ........... B06B 1/0292
CN 107085217 A * 8/2017
(Continued)

OTHER PUBLICATIONS

Ultrasonic Table with acoustic properties of materials (Year: 2017).*
(Continued)

*Primary Examiner* — Isam A Alsomiri
*Assistant Examiner* — Vikas Atmakuri
(74) *Attorney, Agent, or Firm* — Posz Law Group, PLC

(57) ABSTRACT

An ultrasonic sensor includes an ultrasonic element and an element accommodation case. A side wall portion of the element accommodation case has a tubular shape surrounding a directional central axis. A bottom wall portion and a top wall portion of the element accommodation case cover ends of the side wall portion in a direction along the directional central axis. The top wall portion has a diaphragm portion. The bottom wall portion supports the ultrasonic element. For example, the ultrasonic element is opposed to the diaphragm portion across a gap defining an interval corresponding to an integral multiple of half of a wavelength of ultrasonic vibration. Alternatively, the diaphragm portion is formed of a material having an acoustic impedance of $50 \times 10^5$ Pa·s/m or more and $5000 \times 10^5$ Pa·s/m or less, and has a thickness of 1 mm or less.

24 Claims, 7 Drawing Sheets

(56) References Cited

U.S. PATENT DOCUMENTS

| | | | |
|---|---|---|---|
| 10,517,566 B2 * | 12/2019 | Kiyose | A61B 8/4427 |
| 2003/0121331 A1 * | 7/2003 | Mitsuoka | G01S 15/931 |
| | | | 73/632 |
| 2006/0043843 A1 * | 3/2006 | Sugiura | B06B 1/0629 |
| | | | 310/348 |
| 2007/0079661 A1 | 4/2007 | Yoshida et al. | |
| 2007/0144261 A1 | 6/2007 | Okuda et al. | |
| 2008/0116765 A1 * | 5/2008 | Sugiura | B06B 1/0629 |
| | | | 310/334 |
| 2008/0232197 A1 * | 9/2008 | Kojima | G01S 15/931 |
| | | | 367/99 |
| 2011/0036171 A1 * | 2/2011 | Maris | G10K 15/046 |
| | | | 73/606 |
| 2011/0261651 A1 * | 10/2011 | Okuda | G01S 7/52004 |
| | | | 367/93 |
| 2011/0293128 A1 | 12/2011 | Kuratani et al. | |
| 2013/0100776 A1 * | 4/2013 | Karl | G10K 9/122 |
| | | | 367/137 |
| 2013/0294204 A1 * | 11/2013 | Zhang | G01S 7/521 |
| | | | 367/171 |
| 2015/0082888 A1 | 3/2015 | Otsu et al. | |
| 2016/0209501 A1 * | 7/2016 | Bartylla | G10K 9/122 |
| 2016/0327523 A1 * | 11/2016 | Shimoyama | G01N 29/2406 |
| 2017/0194934 A1 | 7/2017 | Shelton et al. | |
| 2017/0280218 A1 | 9/2017 | Wang et al. | |

FOREIGN PATENT DOCUMENTS

| | | | | |
|---|---|---|---|---|
| GB | 2521762 A | * | 7/2015 | G01S 7/521 |
| JP | 2006-319789 A | | 11/2006 | |
| JP | 2007-090298 A | | 4/2007 | |
| JP | 2011-250327 A | | 12/2011 | |
| JP | 2017148697 A | * | 8/2017 | |
| WO | WO-2013053586 A1 | * | 4/2013 | G01H 11/06 |
| WO | WO-2018019778 A1 | * | 2/2018 | B06B 1/0292 |

OTHER PUBLICATIONS

Chapagain, Grooved Backing Structure for CMUT, 2013, IEEE transactions on Ultrasonics, Ferroelectrics and Frequency control, vol. 60, No. 11, Nov. 2013, pp. 2440-2452 (Year: 2013).*

* cited by examiner

ULTRASONIC SENSOR

CROSS REFERENCE TO RELATED APPLICATIONS

The present application claims the benefit of priority from Japanese Patent Applications No. 2018-18530 filed on Feb. 5, 2018 and No. 2019-2914 filed on Jan. 10, 2019. The entire disclosures of all of the above application are incorporated herein by reference.

TECHNICAL FIELD

The present disclosure relates to an ultrasonic sensor.

BACKGROUND

For example, in an ultrasonic sensor, a case has a bottomed tubular shape having a bottom portion and a side wall portion, and a piezoelectric element is attached to the bottom portion of the case.

SUMMARY

The present disclosure provides an ultrasonic sensor including: an ultrasonic element that is configured to convert an electric signal and an ultrasonic vibration; and an element accommodation case that is configured to have an air-tightly and fluid-tightly sealed structure and accommodates the ultrasonic element therein. The element accommodation case has a side wall portion, a bottom wall portion, and a top wall portion. The top wall portion is provided with a diaphragm portion that ultrasonically vibrates in the direction along the directional central axis while bending during transmission or reception of an ultrasonic wave by the ultrasonic element. The bottom wall portion supports the ultrasonic element thereon such that the ultrasonic element is opposed to the top wall portion across a gap.

BRIEF DESCRIPTION OF THE DRAWINGS

The above and other objects, features and advantages of the present disclosure will become more apparent from the following detailed description made with reference to the accompanying drawings, in which like parts are designated by like reference numbers and in which.

DETAILED DESCRIPTION

Figure 1:
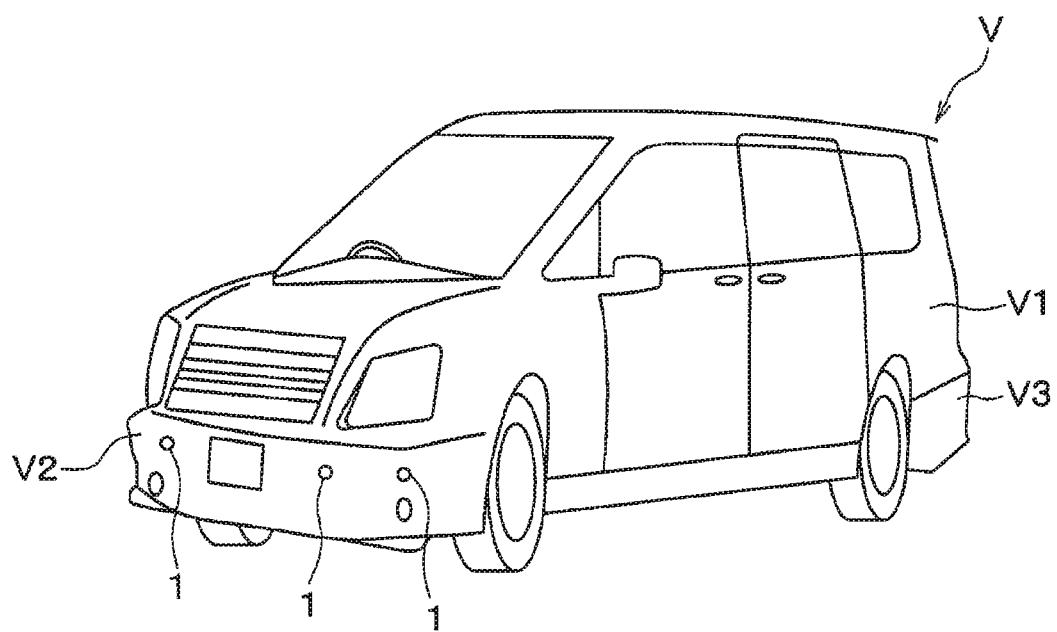
FIG. 1 is a diagram illustrating a schematic perspective view of a vehicle equipped with clearance sonars including ultrasonic sensors according to an embodiment of the present disclosure.

An ultrasonic sensor is, for example, equipped to an outer wall of a vehicle, such as at a bumper. In such an ultrasonic sensor equipped to the vehicle, a hard foreign material, such as a small stone, is likely to collide with a case that accommodates an ultrasonic element, such as a piezoelectric element, therein. In such a case, cracks will occur in the ultrasonic element attached to the case, or the ultrasonic element will be separated from the case.

In order to suppress an occurrence of cracks or an occurrence of separation of the ultrasonic element, it may be conceivable to increase the thickness of the case. In this case, however, the ultrasonic element needs to generate a large driving force so as to vibrate the thick case, resulting in an increase in size of the sensor.

According to a first aspect of the present disclosure, an ultrasonic sensor includes an ultrasonic element and an element accommodation case. The ultrasonic element is configured to convert an electric signal and an ultrasonic vibration. The element accommodation case is configured to have an air-tightly and fluid-tightly sealed structure and accommodates the ultrasonic element therein. The element accommodation case has a side wall portion, a bottom wall portion, and a top wall portion. The side wall portion has a tubular shape surrounding a directional central axis. The bottom wall portion covers an end of the tubular shape of the side wall portion in a direction along the directional central axis. The top wall portion covers an opposite end of the tubular shape of the side wall portion in the direction along the directional central axis. The top wall portion is provided with a diaphragm portion that ultrasonically vibrates in the direction along the directional central axis while bending during transmission or reception of an ultrasonic wave by the ultrasonic element. The bottom wall portion supports the ultrasonic element thereon such that the ultrasonic element is opposed to the top wall portion across a gap. The gap is provided such that the ultrasonic element and the diaphragm portion are opposed to each other in the direction along the directional central axis at an interval that corresponds to an integral multiple of half of a wavelength of the ultrasonic vibration.

According to a second aspect of the present disclosure, an ultrasonic sensor includes an ultrasonic element and an element accommodation case. The ultrasonic element is configured to convert an electric signal and an ultrasonic vibration. The element accommodation case is configured to have an air-tightly and fluid-tightly sealed structure and accommodating the ultrasonic element therein. The element accommodation case has a side wall portion, a bottom wall portion, and a top wall portion. The side wall portion has a tubular shape surrounding a directional central axis. The bottom wall portion covers an end of the tubular shape of the side wall portion in a direction along the directional central axis. The top wall portion covers an opposite end of the tubular shape of the side wall portion in the direction along the directional central axis. The top wall portion is provided with a diaphragm portion that ultrasonically vibrates in the direction along the directional central axis while bending during transmission or reception of an ultrasonic wave by the ultrasonic element. The bottom wall portion supports the ultrasonic element thereon such that the ultrasonic element is opposed to the top wall portion across a gap. The diaphragm portion is formed of a material having an acoustic impedance of $50 \times 10^5$ Pa·s/m or more and $5000 \times 10^5$ Pa·s/m or less. The diaphragm portion has a thickness of 1 mm or less.

In the configurations described above, the ultrasonic element is accommodated in the element accommodation case having the air-tightly and fluid-tightly sealed structure. Specifically, the ultrasonic element is supported at the bottom wall portion of the element accommodation case on one end in the direction along the directional central axis. Further, the ultrasonic element is opposed to and spaced from the top wall portion, which has the diaphragm portion, across the gap.

Namely, in the above configurations, the ultrasonic element is supported on the bottom wall portion, and is not attached to the top wall portion. Therefore, even if a hard foreign material, such as a small stone, hits against the top wall portion, occurrence of drawbacks, such as cracks in the ultrasonic element or separation of the ultrasonic element from the bottom wall portion, can be favorably suppressed.

In the above configuration, the ultrasonic element and the diaphragm portion may be opposed to each other in the direction along the directional central axis at an interval that corresponds to an integral multiple of half of a wavelength of the ultrasonic vibration. Alternatively, the diaphragm portion may be formed of a material having an acoustic impedance of $50 \times 10^5$ Pa·s/m or more and $5000 \times 10^5$ Pa·s/m or less, and may have a thickness of 1 mm or less.

Therefore, the ultrasonic vibration can be transferred satisfactorily in a state where gas, such as air, is not exchanged between the gap G, which is the space between the ultrasonic element and the diaphragm portion, and the space outside the diaphragm portion. As such, in such a configuration, transmission or reception of ultrasonic waves by the ultrasonic sensor can be satisfactorily performed.

Further, occurrences of drawbacks, such as cracks in the sensor substrate or the separation of the sensor substrate from the bottom wall portion, will be favorably suppressed without increasing the thickness of the top wall portion. Also, ultrasonic wave transmission or reception can be satisfactorily performed. Therefore, it is possible to favorably protect the ultrasonic element while avoiding an increase in the size of the ultrasonic sensor.

Hereinafter, embodiments of the present disclosure will be described with reference to the drawings.

(Overall Structure of Clearance Sonar)

Referring to FIG. 1, a vehicle V is a four-wheeled vehicle and has, for example, a box-shaped vehicle body V1. The vehicle body V1 has a front bumper V2, as a vehicle body member, at a front end. The vehicle body V1 has a rear bumper V3, as a vehicle body member, at a rear end. The front bumper V2 and the rear bumper V3 are equipped with clearance sonars 1.

Figure 2:
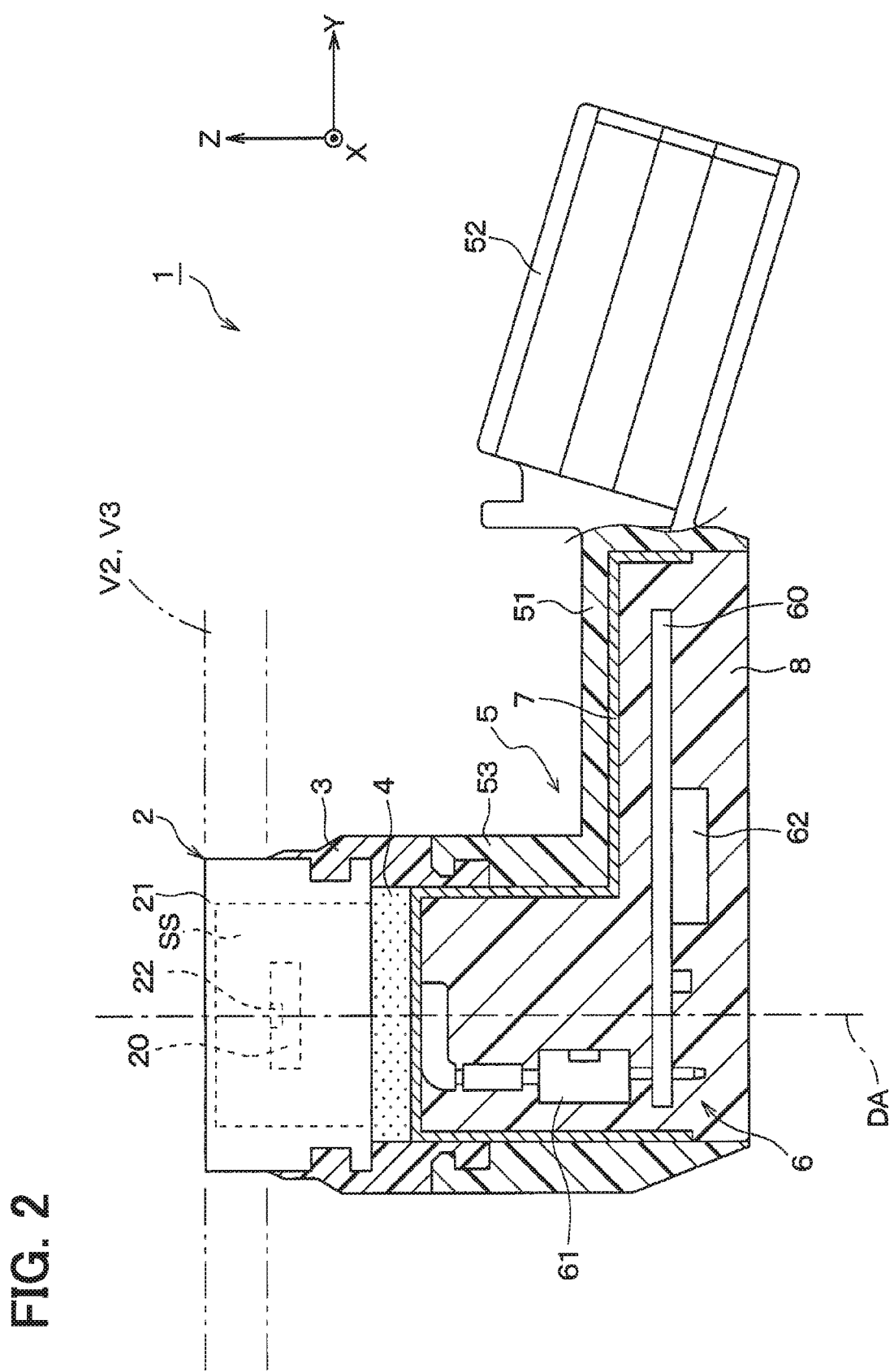
FIG. 2 is a diagram illustrating a cross-sectional view of the clearance sonar shown in FIG. 1.

Referring to FIG. 2, each of the clearance sonars 1 includes an ultrasonic sensor 2, an elastic holding member 3, a damper member 4, a sensor case 5, an electric circuit 6, a shield part 7, and a filling material 8.

Hereinafter, a schematic configuration of each part constituting the clearance sonar 1 will be described.

The ultrasonic sensor 2 is configured to transmit and receive ultrasonic waves. That is, the ultrasonic sensor 2 is configured to transmit a probe wave along a directional central axis DA based on a drive signal applied thereto. The "directional central axis" is an imaginary half line extending along a transmission and reception direction of the ultrasonic wave from the ultrasonic sensor 2, and serves as a reference of a directivity angle. The "directional central axis" will also be referred to as a detection axis. The ultrasonic sensor 2 is configured to receive a reflected wave by an object existing around the ultrasonic sensor 2 and generate a reception signal.

For the convenience of explanation, as shown in FIG. 2, a right handed XYZ orthogonal coordinate system is defined in such a manner that the Z axis is parallel to the directional central axis DA. In this case, a direction parallel to the directional central axis DA is referred to as a "directional central axis direction". "Distal end portion" or "distal end side" in the directional central axis direction corresponds to the upper portion or the upper side of a respective element in FIG. 2, that is, in the Z axis positive direction. Further, "base end portion" or "base end side" in the directional central axis direction corresponds to the lower portion or the lower side of a respective element in FIG. 2, that is, in the Z axis negative direction. Also, an arbitrary direction orthogonal to the directional central axis direction will be referred to as "in-plane direction". The "in-plane direction" is a direction parallel to an XY plane in FIG. 2.

The ultrasonic sensor 2 includes a sensor substrate 20 and an element accommodation case 21. The element accommodation case 21 has a substantially cylindrical shape in which both ends in the directional central axis direction are closed. The element accommodation case 21 has an airtightly and fluid-tightly sealed structure. The element accommodation case 21 provides a sealed space SS inside thereof. In other words, the element accommodation case 21 is configured to prohibit gas and liquid exchange between the sealed space SS inside the element accommodation case 21 and the space outside the element accommodation case 21.

The sensor substrate 20 is a semiconductor substrate, and has an ultrasonic element 22. The ultrasonic element 22 is formed in the sensor substrate 20 so as to convert an electric signal and an ultrasonic vibration.

The sensor substrate 20 is accommodated in the element accommodation case 21. That is, the element accommodation case 21 is configured to accommodate the ultrasonic element 22 inside the sealed space SS. The configurations of the ultrasonic sensor 2 and the ultrasonic element 22 will be described later in detail.

The elastic holding member 3 is formed of a synthetic resin-based elastic material, such as an insulating and elastic silicone rubber, being not electrically conductive and having elasticity. The synthetic resin-based elastic material is also called as a viscoelastic material or elastomer. The elastic holding member 3 has a substantially cylindrical shape. The elastic holding member 3 is configured to elastically support the ultrasonic sensor 2 by covering the base end portion of the ultrasonic sensor 2 while exposing the distal end portion of the ultrasonic sensor 2 in the directional central axis direction.

The damper member 4 is a disk-shaped member, and has an outer diameter corresponding to the inner diameter of the elastic holding member 3. In other words, the damper member 4 is fitted in the cylindrical space inside the elastic holding member 3 at a position adjacent to the base end portion of the elastic holding member 3 than the portion of the elastic holding member 3 elastically supporting the ultrasonic sensor 2 in the directional central axis direction. The damper member 4 is provided by a foamed elastic member, such as a foamed silicone, which is not electrically conductive and has elasticity, so as to suppress transmission of vibrations from the ultrasonic sensor 2 to the sensor case 5.

The sensor case 5 constitutes a housing of the clearance sonar 1, and is configured to hold the base end portion of the elastic holding member 3 in the directional central axis direction. That is, the ultrasonic sensor 2 is supported by the sensor case 5 via the elastic holding member 3.

In the present embodiment, the sensor case 5 has a case body portion 51, a connector portion 52, and a case tubular portion 53. The sensor case 5 is integrally formed of a hard synthetic resin such as polypropylene. That is, the case body portion 51, the connector portion 52 and the case tubular portion 53 are integrally formed.

The case body portion 51 is a box-shaped portion having a substantially rectangular parallelepiped shape. The case body portion 51 has a bottomed tubular shape having an opening at the base end side in the directional central axis direction. The connector portion 52 extends outward from the side wall portion of the case body portion 51. The connector portion 52 is configured to enable the clearance sonar 1 to be electrically connected to an external device such as an electronic control unit or the like.

The case tubular portion 53 is a substantially cylindrical portion. The case tubular portion 53 protrudes from the case body portion 51 toward the distal end side in the directional central axis direction. The case tubular portion 53 is provided such that an inner cylindrical space of the case tubular portion 53 is in communication with a substantially parallelepiped-shaped space defined inside of the case body portion 51. Hereinafter, the space inside the case tubular portion 53 and the space inside the case body portion 51 will be collectively referred to as a space inside the sensor case 5.

The electric circuit 6 includes a control board 60 and a wiring portion 61. The control board 60 and the wiring portion 61 are accommodated in the space inside the sensor case 5. The control board 60 is electrically connected to the ultrasonic sensor 2 through the wiring portion 61. Also, the shield part 7 is accommodated in the space inside of the sensor case 5. That is, the sensor case 5 is configured to accommodate the control board 60, which is electrically connected to the ultrasonic sensor 2 through the wiring portion 61, and the wiring portion 61, as well as to elastically support the ultrasonic sensor 2.

The electric circuit 6 disposed inside the clearance sonar 1 is provided by the control board 60 and the wiring portion 61. On the control board 60, a plurality of electric circuit elements including a control circuit portion 62 are mounted.

The control circuit portion 62 is provided so as to control an operation of the clearance sonar 1. In other words, the control circuit portion 62 controls a transmission and reception operation of the ultrasonic sensor 2 based on a control signal received from an external device, such as an electronic control unit. In addition, the control circuit portion 62 transmits an object detection signal corresponding to the reception signal obtained by the transmission and reception operation of the ultrasonic sensor 2 to the external device.

The shield part 7 is provided in the sensor case 5 so as to electromagnetically shield at least a part of the electric circuit 6. Specifically, the shield part 7 is fixed to the inner surface of the sensor case 5 so as to cover the control board 60 and the wiring portion 61. The space inside the sensor case 5 is filled with the filling material 8. The filling material 8 is made of a material that is not electrically conductive and has elasticity, such as an insulating and elastic silicone rubber.

(Configuration of Ultrasonic Sensor)

Figure 3:
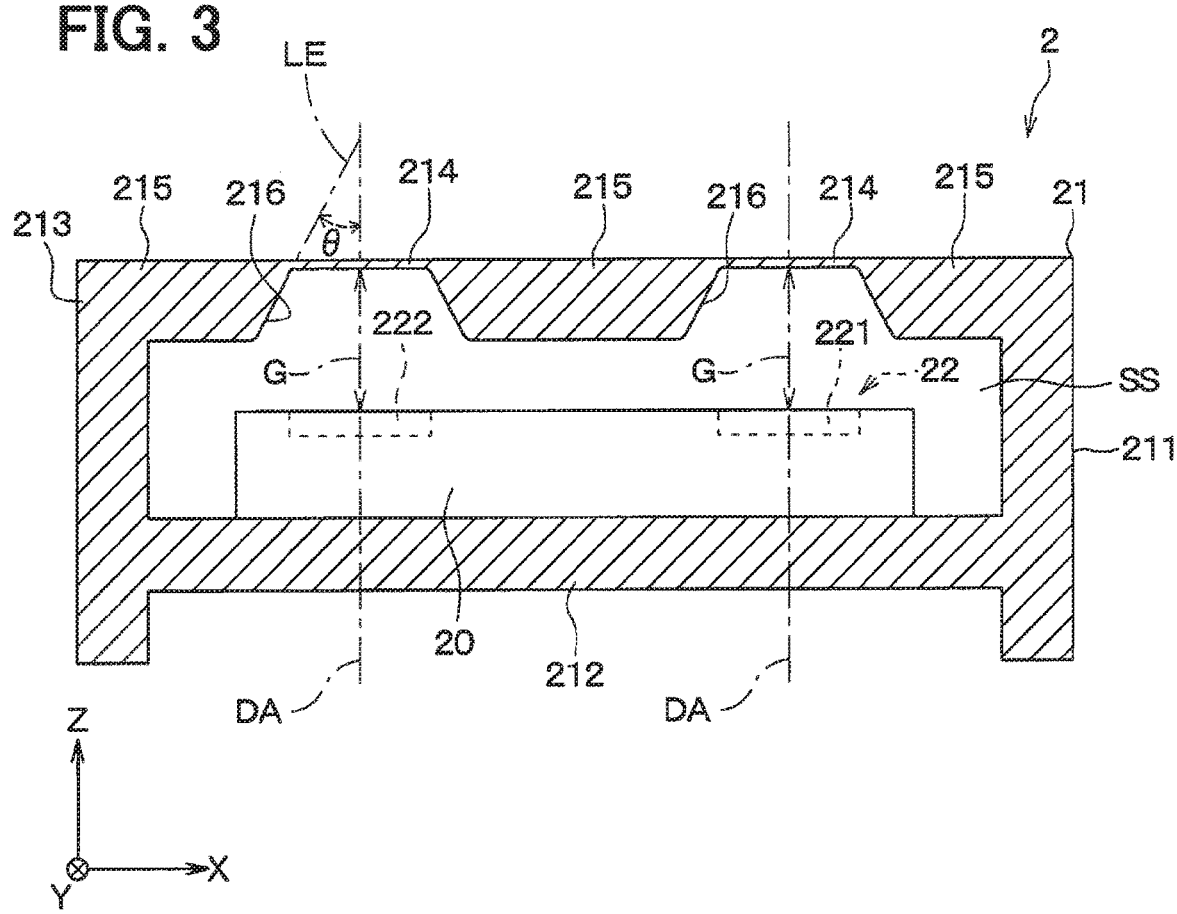
FIG. 3 is a diagram illustrating a cross-sectional view of the ultrasonic sensor of the clearance sonar shown in FIG. 2.

Referring to FIG. 3, configurations of the ultrasonic sensor 2 will be described in detail. Note that the right-handed XYZ orthogonal coordinate system shown in FIG. 3 corresponds to the right-handed XYZ orthogonal coordinate system shown in FIG. 2.

The element accommodation case 21 is made of a metal such as aluminum. Specifically, the element accommodation case 21 has a side plate portion 211, a bottom plate portion 212, and a top plate portion 213. The side plate portion 211, the bottom plate portion 212 and the top plate portion 213, respectively, correspond to a side wall portion, a bottom wall portion and a top wall portion. For example, the top plate portion 213 provides an outer surface when the clearance sonar 1 is attached to the vehicle V, and the bottom plate portion 212 is located more inside than the top plate portion 213.

The side plate portion 211 is formed into a tubular shape surrounding the directional central axis DA. In the present embodiment, the side plate portion 211 is formed into a cylindrical shape having a central axis substantially parallel to the directional central axis DA. The bottom plate portion 212 is a substantially flat plate portion and is provided so as to close the base end portion of the side plate portion 211 in the directional central axis direction. The top plate portion 213 is provided so as to close the distal end portion of the side plate portion 211 in the directional central axis direction.

The element accommodation case 21 is configured so as to support the sensor substrate 20 having the ultrasonic element 22 on the bottom plate portion 212 such that the ultrasonic element 22 is opposed to the top plate portion across a gap G. Further, a dry inert gas, such as dry nitrogen gas, is sealed in the sealed space SS, which provides the gap G, at pressure of 1 atm (101.325 kPa) or more.

The top plate portion 213 has a diaphragm portion 214 and a support portion 215. The diaphragm portion 214 is configured to ultrasonically vibrate in the directional central axis direction while bending or deforming, when the ultrasonic element 22 transmits or receives the ultrasonic wave. The support portion 215 is a portion that supports the outer edge of the diaphragm portion 214, and is thicker than the diaphragm portion 214. That is, the diaphragm portion 214 is excited with the central portion in the in-plane direction of the diaphragm portion 214 as a free end and the outer edge portion fixedly supported by the support portion 215 as a fixed end.

In the present embodiment, the diaphragm portion 214 is formed of a material having an acoustic impedance of $50 \times 10^5$ Pa·s/m or more and $5000 \times 10^5$ Pa·s/m or less. The diaphragm portion 214 has a thickness of 1 mm or less, for example, about 0.1 mm. For example, the acoustic impedance is preferably $50 \times 10^5$ Pa·s/m or more and $500 \times 10^5$ Pa·s/m or less. For example, the thickness is preferably 0.15 mm or less. Namely, the diaphragm portion 214 is preferably formed of a material having an acoustic impedance of $50 \times 10^5$ Pa·s/m or more and $500 \times 10^5$ Pa·s/m or less, and preferably has a thickness of 0.15 mm or less. On the other hand, the support portion 215 has a thickness that is twice or more the thickness of the diaphragm portion 214. The support portion 215 has a thickness of about 0.4 mm, for example.

In the present embodiment, the top plate portion 213 is formed integrally and seamlessly. That is, the outer edge portion of the diaphragm portion 214 and the support portion 215 seamlessly connect to each other. Further, the diaphragm portion 214 and the support portion 215 are formed of the same material.

The diaphragm portion 214 is disposed at a position corresponding to the ultrasonic element 22 in the in-plane direction. That is, the diaphragm portion 214 is disposed at a position overlapping with the ultrasonic element 22 when viewed in the directional central axis direction. Further, the gap G is provided such that the ultrasonic element 22 and the diaphragm portion 214 are opposed to each other across a space, that is, at an interval corresponding to an integral multiple of half of the wavelength in the ultrasonic vibration of the ultrasonic element 22 in the directional central axis direction. Specifically, in the present embodiment, the ultrasonic element 22 and the diaphragm portion 214 are opposed to each other and spaced from each other across the gap G that defines a distance corresponding to half of the wavelength in ultrasonic vibration of the ultrasonic element 22. Note that the wavelength of the ultrasonic vibration of the ultrasonic element 22 may be calculated on the basis of the propagation speed in the sealed space SS at a predetermined reference temperature (for example, room temperature).

In the present embodiment, the top plate portion 213 has a flat outer surface, that is, a flat surface on the distal end side in the directional central axis direction. In other words, the diaphragm portion 214 and the support portion 215 are provided such that outer surfaces thereof are coplanar.

An end surface 216 of the support portion 215 adjoining to the diaphragm portion 214 is inclined relative to the directional central axis direction so as to face the ultrasonic element 22. That is, the end surface 216 is oriented toward the sensor substrate 20 such that an outward normal line intersects with the sensor substrate 20. Specifically, in the present embodiment, the end surface 216 has a shape corresponding to a side surface of a truncated pyramid space.

The end surface 216 is formed so that a bus extension line LE forms an angle θ of 20 degrees or more relative to the directional central axis DA. In FIG. 3, the bus extension line LE is an imaginary half line obtained by extending an intersection line between the end surface 216 and a virtual plane that passes through the directional central axis DA and is parallel with the XZ plane.

In the present embodiment, the top plate portion 213 has two diaphragm portions 214. The sensor substrate 20 has two ultrasonic elements 22 correspondingly to the two diaphragm portions 214 of the top plate portion 213.

One of the ultrasonic element 22 arranged to oppose one of the two diaphragm portions 214 is provided as a transmitting element 221 for converting the electric signal into the ultrasonic vibration. The other one of the ultrasonic elements 22 arranged to oppose the other one of the two diaphragm portions 214 is provided as a receiving element 222 for converting the ultrasonic vibration into the electric signal.

(Configuration of Ultrasonic Element)

Figure 4:
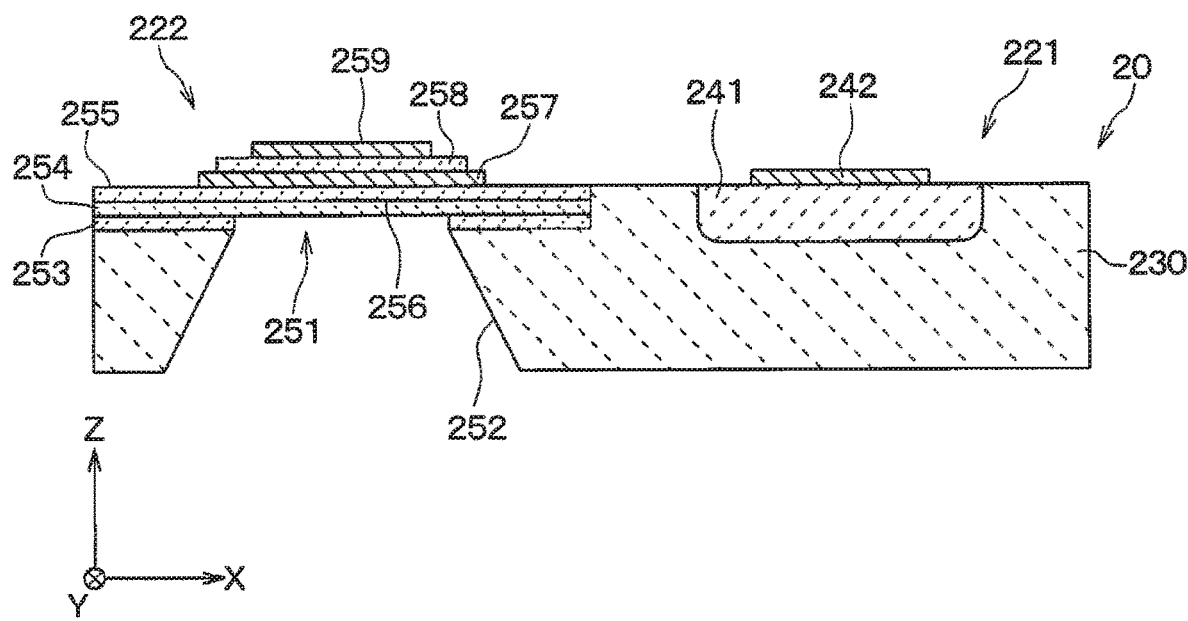
FIG. 4 is a diagram illustrating a cross-sectional view of a sensor substrate of the ultrasonic sensor shown in FIG. 3.

Referring to FIG. 4, configurations of the sensor substrate 20 will be described in detail. Note that the right-handed XYZ orthogonal coordinate system shown in FIG. 4 corresponds to the right-handed XYZ orthogonal coordinate system shown in FIGS. 2 and 3.

In the present embodiment, the sensor substrate 20 is provided by a silicon-on-insulator (SOI) substrate. That is, the transmitting element 221 and the receiving element 222 are formed on a support substrate portion 230 made of a silicon substrate.

In the present embodiment, the transmitting element 221 is a so-called thermoacoustic element, and has a heat insulating layer 241 and a heater 242.

The heater 242 is a heat generating thin film. The transmitting element 221 electrically drives the heater 242 to cause a change of temperature in an ultrasonic cycle to an air layer adjacent to the surface of the heater 242 so as to generate pressure waves, to thereby to oscillate ultrasonic waves.

The heat insulating layer 241 is a porous silicon layer disposed adjacent to the front surface of the supporting substrate portion 230. The heat insulating layer 241 is, for example, formed by anodizing a silicon wafer providing the supporting substrate portion 230. The heater 242 is a thin film made of a metal, such as aluminum. The heater 242 is disposed on the heat insulating layer 241. This type of thermoacoustic element is already known at the time of filing of the present application. Therefore, a detailed description of the configuration of the transmitting element 221, which is a thermoacoustic element, will be omitted.

The receiving element 222 is a micro electro mechanical systems (MEMS) element having a function of converting mechanical vibrations and electric signals. The receiving element 222 includes a vibration portion 251 that ultrasonically vibrates in the directional central axis direction.

FIG. 4 shows an example in which the receiving element 222 is formed as a piezoelectric element. As shown in FIG. 4, the supporting substrate portion 230 is formed with a hole 252 at a position corresponding to the vibration portion 251 of the receiving element 222. The hole 252 is formed so as to open only to the back surface side of the sensor substrate 20 by performing a process such as etching to the back surface of the sensor substrate 20.

A first insulating film 253, a silicon active layer 254, and a second insulating film 255 are provided at a region corresponding to the vibration portion 251 in the sensor substrate 20. The support substrate portion 230, the first insulating film 253, the silicon active layer 254, and the second insulating film 255 are arranged in this order from the bottom to the top in FIG. 4 in the directional central axis direction, and are joined to one another. The hole 252 penetrates the support substrate portion 230 and the first insulating film 253. An end of the hole 252 in the directional central axis direction is closed by the silicon active layer 254.

A portion of a stacked body of the silicon active layer 254 and the second insulating film 255, corresponding to the hole 252, forms a membrane portion 256. On the membrane portion 256, a lower electrode 257, a piezoelectric layer 258, and an upper electrode 259 are arranged in this order from the bottom to the top in FIG. 4 in the directional central axis direction, and are joined to one another. The membrane portion 256 is configured to be able to ultrasonically vibrate in the directional central axis direction while bending or deforming, when a high frequency voltage is applied between the lower electrode 257 and the upper electrode 259. This type of the MEMS element is already known at the time of filing of the present application. Therefore, a detailed description of the configuration of the receiving element 222, which is the MEMS element, will be omitted.

Advantageous Effects

Hereinafter, advantageous effects achieved by the configurations of the present embodiment will be described with reference to the drawings.

In the present embodiment, the sensor substrate 20 having the ultrasonic element 22 is accommodated in the element accommodation case 21 having the air-tightly and fluid-tightly sealed structure. Specifically, the sensor substrate 20 is supported at the bottom plate portion 212 of the element accommodation case 21, which is on one end side in the directional central axis direction. Further, the sensor substrate 20 is opposed to the top plate portion 213 having the diaphragm portion 214, which ultrasonically vibrates in the element accommodation case 21, in the directional central axis direction across the gap G.

That is, in the configuration of the present embodiment, the sensor substrate 20 is supported at the bottom plate portion 212, and is not attached to the top plate portion 213, which is exposed to the outside when the ultrasonic sensor 2 is mounted in the vehicle. Therefore, even if a hard foreign material, such as a small stone, hits against the top plate portion 212, it is less likely that cracks will occur in the sensor substrate 20 or the sensor substrate 20 will be separated from the bottom plate portion 212.

In the configuration of the present embodiment, the ultrasonic element 22 and the diaphragm portion 214 are opposed to each other with the space in the directional central axis direction, the space corresponding to an integral multiple (that is, 1 time) of the wavelength of the ultrasonic vibration of the ultrasonic element 22. The diaphragm portion 214 is formed of the material having an acoustic impedance of $50 \times 10^5$ Pa·s/m or more and $5000 \times 10^5$ Pa·s/m or less. The diaphragm portion 214 has a thickness of 1 mm or less.

Therefore, the transfer of ultrasonic vibration can be performed satisfactorily in a state where gas, such as air, is not exchanged between the gap G, which is the space between the ultrasonic element 22 and the diaphragm portion 214, and the space outside the diaphragm portion 214. As such, transmission or reception of ultrasonic waves by the ultrasonic sensor 2 can be satisfactorily performed.

As described above, in the configuration of the present embodiment, occurrences of drawbacks, such as cracks in the sensor substrate 20 or the separation of the sensor substrate 20 from the bottom plate portion 212, will be favorably suppressed without increasing the thickness of the top plate portion 213. Also, ultrasonic wave transmission or reception can be satisfactorily performed by the ultrasonic sensor 2. Therefore, it is possible to favorably protect the ultrasonic element 22 while avoiding an increase in the size of the ultrasonic sensor 2.

In the present embodiment, the outer edge of the diaphragm portion 214 is supported by the thick support portion 215. Further, the diaphragm portion 214 and the support portion 215 are seamlessly and integrally formed.

In such a configuration, therefore, the rigidity of the top plate portion 213 can be favorably secured. That is, the sensor substrate 20 and the ultrasonic element 22 can be well protected.

In the present embodiment, the end surface 216 of the support portion 215, which adjoins to the diaphragm portion 214 and supports the outer edge of the diaphragm portion 214, is inclined relative to the directional central axis AD to face the ultrasonic element 22. In such a configuration, the probe wave transmitted from the transmission element 221 is well narrowed down by the end surface 216 surrounding the directional central axis DA. Therefore, the transmission capability of the probe wave by the ultrasonic sensor 2 improves.

In the present embodiment, the ultrasonic element 22 is formed as a semiconductor element on the sensor substrate 20, which is a semiconductor substrate. In such a configuration, it is possible to satisfactorily reduce the size of the ultrasonic element 22 while maintaining the transmission and reception performance of the ultrasonic element 22. Therefore, it is possible to have a plurality of ultrasonic elements 22 to make the ultrasonic sensor 2 highly functional without increasing the size of the ultrasonic sensor 2.

In the present embodiment, as the ultrasonic element 22, the transmitting element 221 and the receiving element 222 are individually provided. In such a configuration, even if reverberation occurs immediately after the transmission of the probe wave by the transmitting element 221, the receiving capability of the receiving element 222 is not affected by the reverberation. Therefore, a detection capability can be favorably obtained even for an object close to the ultrasonic sensor 2. In addition, since the transmitting element 221 and the receiving element 222 are formed on the sensor substrate 20, which is a semiconductor substrate, the ultrasonic sensor 2 can be satisfactorily reduced in size.

In the present embodiment, the transmitting element 221 is provided by the thermoacoustic element, and the receiving element 222 is provided by the MEMS element. In the case where the transmitting element 221 is provided by the thermoacoustic element, the transmission performance of the probe wave is improved. In the case where the receiving element 222 is provided by the MEMS element, the favorable reception performance is achieved. That is, according to the configuration of the present embodiment, the transmission performance and the sensitivity can be compatible at a high level.

In the present embodiment, a dry inert gas, such as dry nitrogen gas, is hermetically sealed in the hermetically sealed space SS inside the element accommodation case 21 having the gap G at a pressure of 1 atm or more. As a result, an occurrence of deterioration due to moisture or oxidation of each part of the ultrasonic element 22 can be satisfactorily suppressed. In addition, it is possible to increase the intensity of compressional waves between the ultrasonic element 22 and the diaphragm portion 214, thereby making it possible to enhance transmission and reception performance.

Modifications

The present disclosure is not limited to the embodiment described hereinabove, but may be suitably modified in various other ways. Hereinafter, representative modifications of the present disclosure will be described. In the following description of the modifications, parts different from the above-described embodiment will be mainly described. In addition, the same reference numerals are given to the parts that are the same or equivalent to the above-described embodiment. Therefore, in the description of the following modifications, regarding components having the same reference numerals as the components of the above-described embodiment, the description in the above-described embodiment can be appropriately cited unless there is a technical inconsistency or a specific additional explanation.

The ultrasonic sensor 2 is not limited to be used for a vehicle. Further, the ultrasonic sensor 2 is not limited to be installed in the clearance sonar 1. That is, the ultrasonic sensor 2 can be used for any other purposes.

The ultrasonic sensor 2 is not limited to a configuration capable of transmitting and receiving ultrasonic waves. That is, for example, the ultrasonic sensor 2 may have a configuration capable of only transmitting ultrasonic waves. Alternatively, the ultrasonic sensor 2 may have only a function of receiving a reflected wave of a probe wave that is an ultrasonic wave transmitted from another ultrasonic transmitter and reflected by an object existing around the ultrasonic sensor 2.

The configuration of each part of the ultrasonic sensor 2 is not limited to the above specific example. For example, the outer shape of the ultrasonic sensor 2 is not limited to a substantially cylindrical shape, and may be a substantially regular hexagonal prism shape, a substantially regular octagonal prism shape, or the like. Further, gas other than the dry inert gas, for example, dry air may be sealed in the sealed space SS. The pressure in the sealed space SS may not be limited to the example described hereinabove.

The dimension of the gap G in the directional central axis direction is not limited to the half of the wavelength of the ultrasonic vibration of the ultrasonic element 22. That is, the gap G can be set so as to be an interval corresponding to n·λ/2, in which A is the wavelength of the ultrasonic vibration of the ultrasonic element 22. In this case, n is an integer of 1 or more, that is, a natural number, and may be an even number, or an odd number. In the above-described embodiment, n is 1 (n=1). However, n may be equal to or greater than 2 (n≥2). In the case where n is an even number, the gap G can be provided such that the ultrasonic element 22 and the diaphragm portion 214 face each other with a space corresponding to an integral multiple of the wavelength of the ultrasonic vibration in the directional central axis direction. The above-mentioned reference temperature is also not limited to room temperature, for example, 20 degrees Celsius (° C.) or 25 degrees Celsius (° C.).

Further, the dimension of the gap G does not necessarily exactly match an integral multiple of half of the wavelength of the ultrasonic vibration of the ultrasonic element 22. That is, a predetermined deviation may occur between the dimensional value of the gap G and the integral multiple of half the wavelength of the ultrasonic vibration of the ultrasonic element 22. Such a deviation can be an appropriate value so as to allow favorable resonation between the ultrasonic element 22 and the diaphragm portion 214. Specifically, in a case where the sealed space SS has a resonance system in structure and has a predetermined Q-value (quality factor), a deviation with a length corresponding to 1/Q is allowable. For example, in a case where n is 1 (n=1), the dimension of the gap G can be approximately λ/2. Namely, in the present disclosure, the meaning of "the dimension of the gap G corresponding to the integral multiple of half of the wavelength of the ultrasonic vibration of the ultrasonic element" includes a value exactly corresponding to and a value approximately or almost corresponding to the integral multiple of half of the wavelength of the ultrasonic vibration of the ultrasonic element 22.

The shape of the diaphragm portion 214 in the in-plane direction is not limited to a substantially rectangular shape, and may be any other shapes, such as a substantially circular shape, a substantially elliptical shape, a substantially regular hexagonal shape, or a substantially regular octagonal shape. The end surface 216 can also have a shape corresponding to the shape of the diaphragm 24, such as a shape of a circumferential face of a truncated cone.

Figure 5:
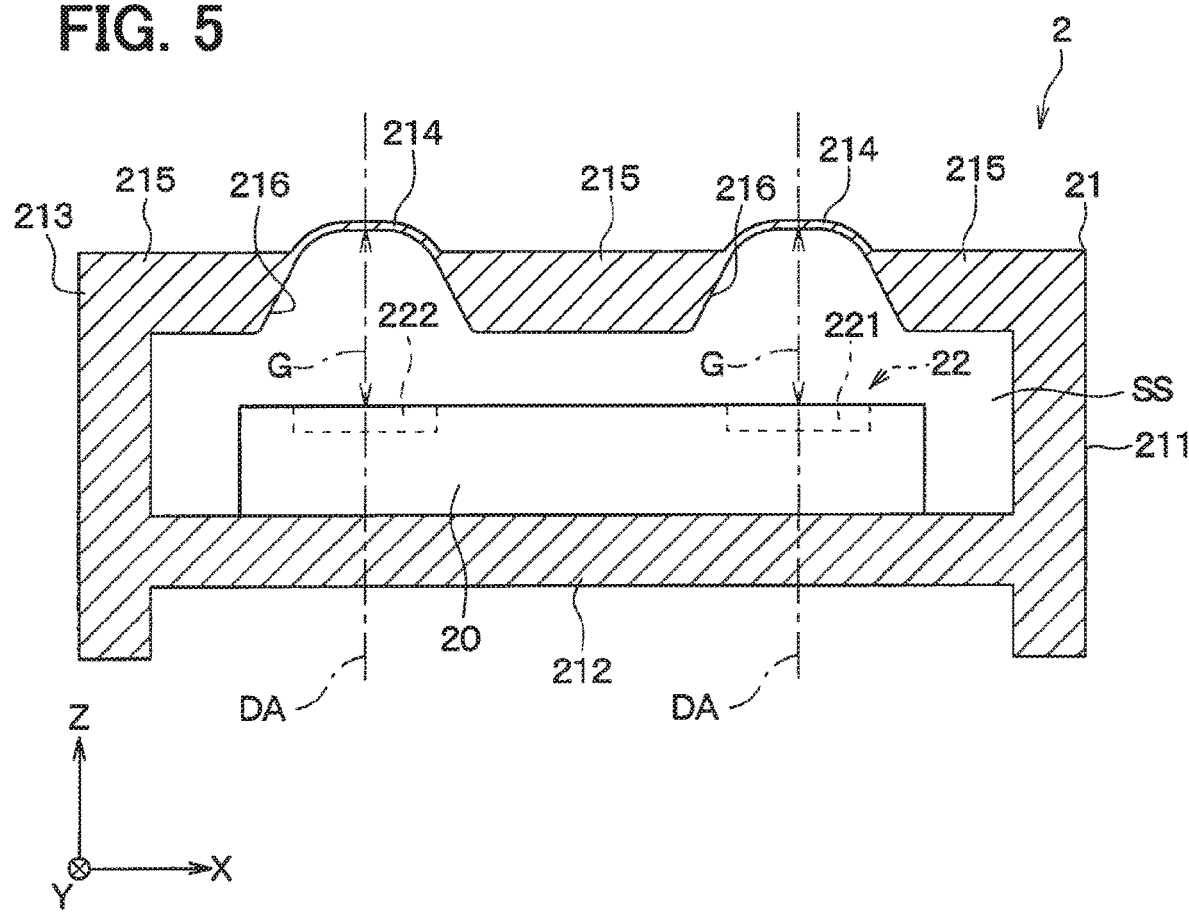
FIG. 5 is a diagram illustrating a cross-sectional view of an ultrasonic sensor according to a modification of the present disclosure.

The cross-sectional shape of the diaphragm portion 214 is not limited to the above specific example. For example, as shown in FIG. 5, the diaphragm portion 214 may be formed in a curved plate shape protruding toward the outside of the element accommodation case 21.

The material of the diaphragm portion 214 is not limited to the above specific example. For example, the diaphragm portion 214 may be formed of a different type of metal than aluminum or an aluminum alloy. Alternatively, the diaphragm portion 214 may be formed of a synthetic resin such as polycarbonate, polystyrene, or the like. Alternatively, the diaphragm portion 214 may be formed of a carbon fiber, a carbon fiber-containing resin, or the like.

The diaphragm portion 214 and the support portion 215 may be made of different materials.

The support portion 215 may be omitted. That is, almost the entirety of the top plate portion 213 may be provided by the diaphragm portion 214.

Both the transmitting element 221 and the receiving element 222 may be provided by the MEMS elements. In this case, the transmitting element 221 and the receiving element 222 may be elements of the same type or elements of different types. The MEMS element is not limited to a piezoelectric element. For example, a so-called capacitive element may be used as the MEMS element.

There is no particular limitation on the number and type of the ultrasonic element 22. For example, the ultrasonic sensor 2 may have two transmitting elements 221 and two receiving elements 222. Alternatively, the ultrasonic sensor 2 may have only one ultrasonic element 22.

Figure 6:
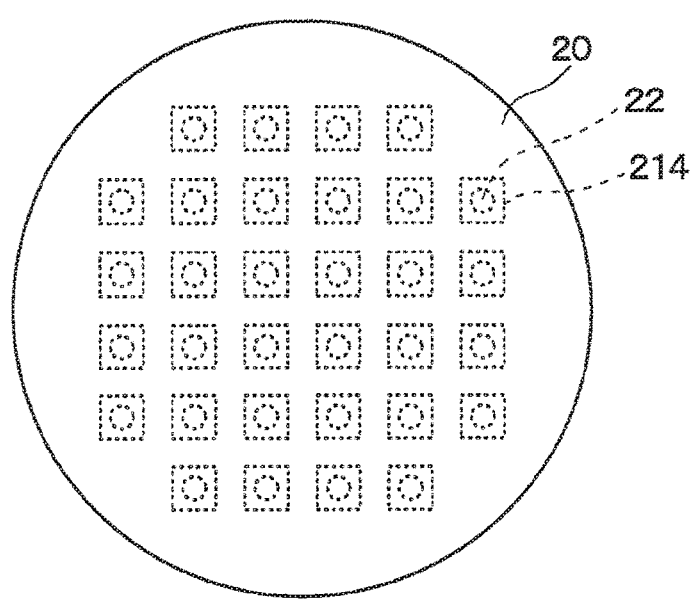
FIG. 6 is a diagram illustrating a plan view of a sensor substrate of an ultrasonic sensor according to another modification of the present disclosure.

As shown in FIG. 6, a plurality of ultrasonic elements 22 may be two-dimensionally arranged in the in-plane direction. In such a configuration, it is possible to satisfactorily reduce the size of the ultrasonic sensor 2 that is the phased array type and capable of controlling the transmission and reception direction. In this case, a plurality of the diaphragm portions 214 may also be two-dimensionally arranged in the in-plane direction so as to correspond to the positions of the ultrasonic elements 22 in the in-plane direction.

Figure 7:
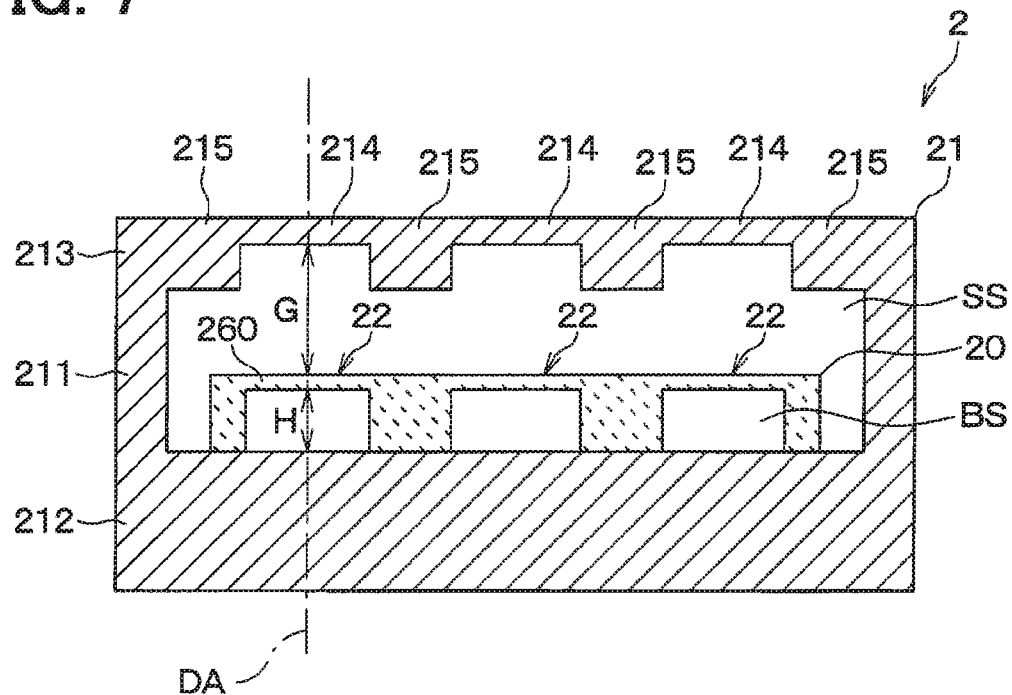
FIG. 7 is a diagram illustrating a cross-sectional view of an ultrasonic sensor according to a further another modification of the present disclosure.

As shown in FIG. 7, an ultrasonic element 22 may be configured such that the distal end side of a back space BS in the directional central axis direction is closed. The back space BS is provided on the back side of the ultrasonic element 22, that is, on the base end side of the ultrasonic element 22 in the directional central axis direction. Also, the back space BS has a predetermined dimension in the directional central axis direction. Both sides of the back space BS in the directional central axis direction are closed. In the example of FIG. 7, specifically, the base end side of the back space BS in the directional central axis direction is closed by a bottom plate portion 212.

In the example of FIG. 7, the ultrasonic element 22 has a similar structure to the receiving element 222 shown in FIG. 4. Namely, the ultrasonic element 22 has a thin plate portion 260. The thin plate portion 260 is in a form of diaphragm or membrane, similarly to the membrane portion 256 shown in FIG. 4, and extends in the in-plane direction so as to vibrate in the directional central axis direction. The back space BS is a space surrounded by the bottom plate portion 212 and the thin plate portion 260.

The back space BS has a dimension H in the directional central axis direction, and the dimension H has a predetermined value that is ¼ or less of the wavelength of the ultrasonic vibration of the ultrasonic element 22 or an integral multiple of the predetermined value, but is different from the integral multiple of the half of the wavelength of the ultrasonic element 22. Typically, when the wavelength of the ultrasonic vibration of the ultrasonic element 22 is defined as λ, the predetermined value is λ/4 or less. More typically, the integral multiple is one time. Namely, more preferably, the dimension H is ¼ or less of the wavelength of the ultrasonic vibration.

In the case where the dimension H of the back space BS is set as described above, the ultrasonic vibration of a diaphragm portion 214 can be favorably enhanced while favorably suppressing an unprepared or unintentional positional displacement or vibration of the ultrasonic element 22 in the directional central axis direction. As such, a sound pressure efficiency of the ultrasonic element 22 improves. In such a configuration, therefore, transmission or reception of the ultrasonic waves can be further favorably performed in the ultrasonic sensor 2. In the case where the dimension H is set to $\lambda/4$ or less, the size of the ultrasonic sensor 2 can be reduced. Note that the dimension H being $\lambda/4$ or less is not necessarily exactly coincide with $\lambda/4$, but may include a predetermined deviation. Specifically, in a case where the back space BS has a resonance system in structure and has a predetermined Q-value, a deviation with a length corresponding to 1/Q is allowable. In this case, therefore, the dimension H can be said as approximately or almost $\lambda/4$.

The back space BS may be formed as an internal space of the sensor substrate 20. Namely, both sides of the back space BS in the directional central axis direction may be closed with the material forming the sensor substrate 20. Further, the ultrasonic element 22 may have a similar structure to the receiving element 221 shown in FIG. 4.

As shown in FIG. 7, the sensor substrate 20 may have a plurality of ultrasonic elements 22. In such a case, the back space BS may be provided for each of the plurality of ultrasonic elements 22 or may be provided for a part of or some of the plurality of ultrasonic elements 22. In the case where the back space BS is provided for the part of or some of the plurality of ultrasonic element 22, the back space BS is provided only for the transmitting ultrasonic element 22 (transmitting element), or only for the receiving ultrasonic element 22 (receiving element).

Figure 8:
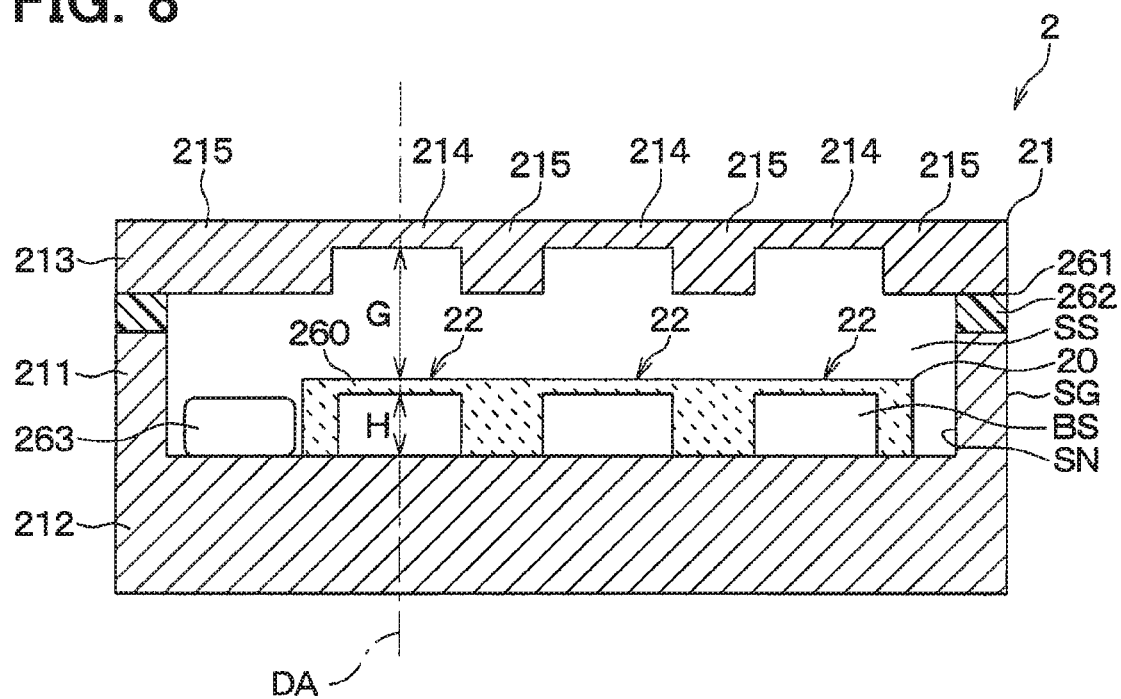
FIG. 8 is a diagram illustrating a cross-sectional view of an ultrasonic sensor according to a still another modification of the present disclosure.
Figure 9:
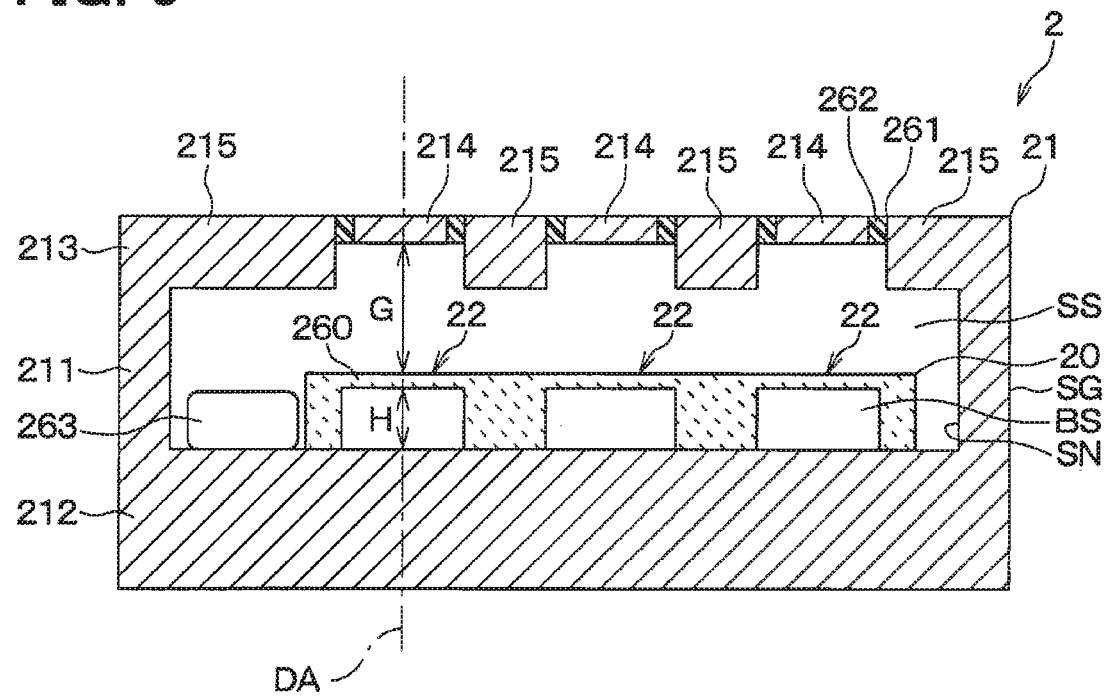
FIG. 9 is a diagram illustrating a cross-sectional view of an ultrasonic sensor according to a yet another modification of the present disclosure.

As shown in FIG. 8 and FIG. 9, an element accommodation case 21 may be formed with a slit 261. The slit 261 extends from an inner wall surface SN of the element accommodation case 21 to an outer wall surface SG of the element accommodation case 21, the inner wall surface SN facing the sealed space SS. The slit 261 is provided to enhance the vibration of a diaphragm portion 214 so as to improve the directivity of the ultrasonic sensor 2.

The slit 261 may be formed at an upper end of the side plate portion 211, as shown in FIG. 8. In this case, the slit 261 is commonly provided for the plurality of diaphragm portions 214. That is, the slit 261 is shared for the plurality of diaphragm portions 214. In this case, the vibration of the top plate portion 213 having the plurality of diaphragm portions 214 is enhanced as a whole.

The slit 261 may be formed at opposite ends of the diaphragm portion 214 in the in-plane direction. In this case, the slit 261 is provided for each of the plurality of diaphragm portions 214.

The slit 261 is air-tightly and fluid-tightly sealed with a sealing material 262 so as to ensure the air-tightness and fluid-tightness of the element accommodation case 21. For example, the sealing material 262 may be formed of a synthetic resin or the like. Further, a hygroscopic material 263 is disposed in the sealed space SS. In such configurations, the change in characteristics due to entry of moisture into the sealed space SS in accordance with the forming of the slit 261 can be suppressed as much as possible.

When the temperature of an operation environment of the ultrasonic sensor 2 changes, a resonance frequency varies. In such a case, the ultrasonic sensor 2 preferably has a configuration for correcting the change in characteristics in accordance with the temperature change.

Figure 10:
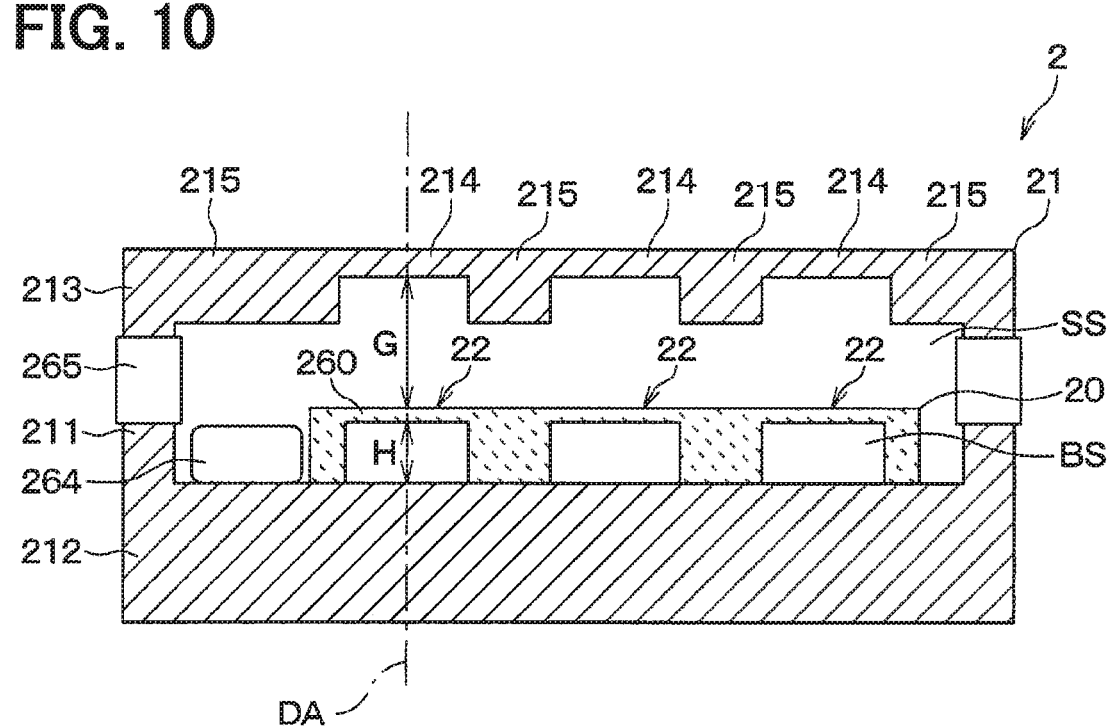
FIG. 10 is a diagram illustrating a cross-sectional view of an ultrasonic sensor according to a yet another modification of the present disclosure.

For example, an ultrasonic sensor 2 shown in FIG. 10 has a temperature sensing portion 264 and an interval adjustment portion 265. The temperature sensing portion 264 is provided to generate an output corresponding to the temperature of the operation environment of the ultrasonic sensor 2. Specifically, in the example of FIG. 10, the temperature sensing portion 264 is disposed in a sealed space SS so as to generate an output corresponding to the temperature of the sealed space SS defined inside of an element accommodation case 21. The interval adjustment portion 265 is configured to allow the interval between the ultrasonic element 22 and the diaphragm portion 214 to vary.

The interval adjustment portion 265 is configured to vary the interval between the ultrasonic element 22 and the diaphragm portion 214 in accordance with the change in temperature of the operation environment of the ultrasonic sensor 2. Specifically, the interval adjustment portion 265 is configured to vary the interval based on the output of the temperature sensing portion 264. For example, the interval adjustment portion 265 may be provided by a piezoelectric element or the like.

Figure 11:
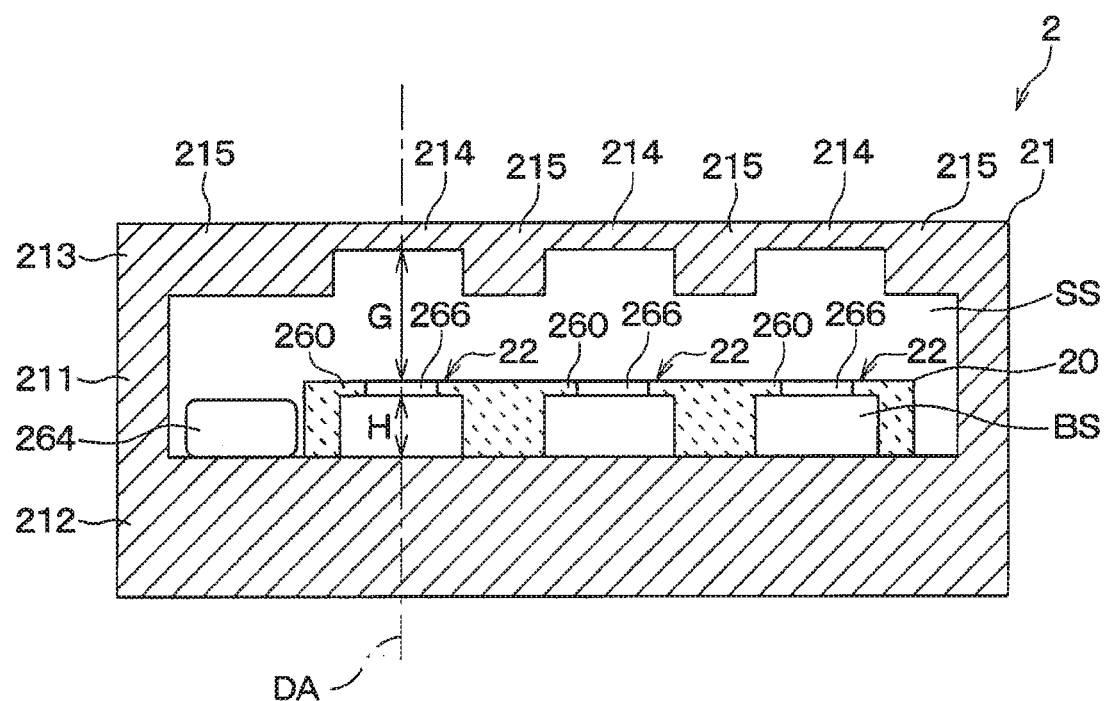
FIG. 11 is a diagram illustrating a cross-sectional view of an ultrasonic sensor according to a yet another modification of the present disclosure.

An ultrasonic sensor 2 shown in FIG. 11 includes a temperature sensing portion 264 and a frequency adjustment portion 266. The frequency adjustment portion 266 is configured to allow the frequency of the ultrasonic vibration of the ultrasonic element 22 to vary.

The frequency adjustment portion 266 is configured to vary the frequency of the ultrasonic vibration of the ultrasonic element 22 in accordance with the change in temperature of the operation environment of the ultrasonic sensor 2. Specifically, the frequency adjustment portion 266 is configured to vary the frequency based on the output of the temperature sensing portion 264.

The arrangement position of the temperature sensing portion 264 is not limited to the position inside of the sealed space SS. For example, the temperature sensing portion 264 may be arranged on an outer wall surface SG of the element accommodation case 21. As another example, the temperature sensing portion 264 may be provided on the control board 60. As further another example, temperature information for controlling the interval adjustment portion 264 or the frequency adjustment portion 266 may be obtained from an external device, such as an electronic control unit (ECU), outside of the clearance sonar 1.

The configuration shown in FIG. 7 is employed to the configurations shown in FIGS. 8 to 11. However, the present disclosure is not limited to the configurations indicated hereinabove. For example, in the configurations shown in FIGS. 8 to 11, the back space BS may be eliminated.

In the configuration shown in FIG. 7, the dimension H may be modified from the value of approximately $\lambda/4$, within the range where the advantageous effects described hereinabove can be achieved. Namely, the dimension H is not limited to the approximately $\lambda/4$. For example, the dimension H may be approximately $\lambda/6$. As another example, the dimension H may be approximately $\lambda/3$. $\lambda/3$ is equal to $2\times\lambda/6$. These modifications may be similarly adopted in the configurations of FIGS. 8 to 11.

In the above configurations, a plurality of elements formed seamlessly and integrally with each other may be separately formed as separate members and bonded to each other. On the other hand, a plurality of elements which are separate members and bonded together may be seamlessly and integrally formed with each other.

In the above configurations, a plurality of elements formed of the same material may be formed of different materials from each other. On the other hand, a plurality of elements formed of different materials may be formed of the same material.

The constituent element(s) of each of the above embodiments is/are not necessarily essential unless it is specifically stated that the constituent element(s) is/are essential in the above embodiments, or unless the constituent element(s) is/are obviously essential in principle. In addition, in the case where the number of the constituent element(s), the value, the amount, the range, and/or the like is specified, the present disclosure is not necessarily limited to the number of the constituent element(s), the value, the amount, and/or the like specified in the embodiment unless the number of the constituent element(s), the value, the amount, and/or the like is indicated as essential or is obviously essential in view of the principle. Similarly, in the case where the shape, the direction, the positional relationship, and/or the like of the constituent element(s) is specified, the present disclosure is not necessarily limited to the shape, the direction, the positional relationship, and/or the like unless the shape, the direction, the positional relationship, and/or the like is/are indicated as essential or is/are obviously essential in principle.

Modifications of the present disclosure are not limited to the above-described modifications. A plurality of modifications may be combined with each other. For example, the slit 261 shown in FIG. 8 or FIG. 9 may be provided in the configuration shown in FIG. 10 or FIG. 11. Also, the frequency adjustment portion 266 shown in FIG. 11 may be provided in the configuration shown in FIG. 10. Furthermore, all or a part of the above-described embodiments and all or a part of the modifications may be combined with each other. For example, the slit 261 shown in FIG. 8 or FIG. 9 may be employed to the configurations shown in FIG. 3 and FIG. 5. Likewise, each of the interval adjustment portion 265 shown in FIG. 10 and the frequency adjustment portion 266 shown in FIG. 11 may be employed to the configurations shown in the other figures, such as in FIG. 3 or in FIG. 5.

What is claimed is:

1. An ultrasonic sensor comprising:
   an ultrasonic element configured to convert an electric signal and an ultrasonic vibration; and
   an element accommodation case configured to have an air-tightly and fluid-tightly sealed structure and accommodating the ultrasonic element therein; and
   an interval adjustment portion configured to vary the interval between the ultrasonic element and the diaphragm portion,
   wherein
   the element accommodation case has a side wall portion, a bottom wall portion and a top wall portion,
   the side wall portion has a tubular shape surrounding a directional central axis,
   the bottom wall portion covers an end of the tubular shape of the side wall portion in a direction along the directional central axis,
   the top wall portion covers an opposite end of the tubular shape of the side wall portion in the direction along the directional central axis,
   the top wall portion is provided with a diaphragm portion that vibrates in the direction along the directional central axis while bending during transmission or reception of an ultrasonic wave by the ultrasonic element,
   the bottom wall portion supports the ultrasonic element thereon such that the ultrasonic element is opposed to the top wall portion across a gap,
   the gap is provided such that the ultrasonic element and the diaphragm portion are opposed to each other in the direction along the directional central axis at an interval that corresponds to an integral multiple of half of a wavelength of the ultrasonic vibration,
   the top wall portion has a support portion supporting an outer edge of the diaphragm portion,
   the support portion has a thickness greater than the diaphragm portion, and
   the diaphragm portion and the support portion are integral with each other.

2. The ultrasonic sensor according to claim 1, wherein
   the diaphragm portion is formed of a material having an acoustic impedance of $50 \times 10^5$ Pa·s/m or more and $5000 \times 10^5$ Pa·s/m or less, and
   the diaphragm portion has a thickness of 1 mm or less.

3. The ultrasonic sensor according to claim 1, wherein
   the support portion has an end surface adjoining to the diaphragm portion, and
   the end surface of the support portion is inclined relative to the directional central axis to face the ultrasonic element.

4. The ultrasonic sensor according to claim 1, wherein
   the top wall portion has two diaphragm portions including the diaphragm portion,
   the ultrasonic element includes a transmitting element and a receiving element,
   the transmitting element is disposed to oppose one of the two diaphragm portions and is configured to convert the electric signal to the ultrasonic vibration, and
   the receiving element is disposed to oppose the other of the two diaphragm portion, and is configured to convert the ultrasonic vibration to the electric signal.

5. The ultrasonic sensor according to claim 4, wherein
   the transmitting element is a thermoacoustic element having a heat insulating layer and a heater disposed on the heat insulating layer, and
   the receiving element is a MEMS element having a vibrating part that vibrates in the direction along the directional central axis.

6. The ultrasonic sensor according to claim 1, wherein
   the diaphragm portion has a curved plate shape protruding toward outside of the element accommodation case.

7. The ultrasonic sensor according to claim 1, wherein
   the gap is sealed with a dry inert gas at pressure of 101.325 kPa or more.

8. The ultrasonic sensor according to claim 1, wherein
   the ultrasonic element is one of a plurality of ultrasonic elements that are disposed on a sensor substrate provided by a semiconductor substrate, and
   the plurality of ultrasonic elements are two-dimensionally arranged in an in-plane direction intersecting with the direction along the directional central axis.

9. The ultrasonic sensor according to claim 1, wherein
   the top wall portion provides an outer surface facing outside and the bottom wall portion is located more inside than the top wall portion, when the ultrasonic sensor is mounted on a vehicle.

10. The ultrasonic sensor according to claim 1, wherein
    the ultrasonic element has a back space both sides of which in the direction along the directional central axis are closed, and
    a dimension of the back space in the direction along the directional central axis has a predetermined value that is ¼ or less of the wavelength of the ultrasonic vibration or an integral multiple of the predetermined value, but is different from the integral multiple of the half of the wavelength.

11. The ultrasonic sensor according to claim 1, wherein the accommodation case is formed with a slit at an end of the side wall portion adjacent to the top wall portion or at opposite sides of the diaphragm portion in the top wall portion in an in-plane direction intersecting with the direction along the directional central axis.

12. The ultrasonic sensor according to claim 11, wherein the slit extends from an inner wall surface of the element accommodation case to an outer wall surface of the element accommodation case, the inner wall surface facing the sealed space provided inside of the element accommodation case, and
the slit is air-tightly and fluid-tightly sealed with a sealing material.

13. The ultrasonic sensor according to claim 12, wherein the element accommodation case has a hygroscopic material in the sealed space.

14. The ultrasonic sensor according to claim 1, further comprising:
a sensor substrate on which the ultrasonic element is provided, wherein
the ultrasonic element includes a transmitting element and a receiving element,
the diaphragm portion includes a first diaphragm portion corresponding to the transmitting element and a second diaphragm portion corresponding to the receiving element,
the sensor substrate is disposed on the bottom wall portion of the element accommodation case,
the sensor substrate is separated from the top wall portion and the side wall portion,
the support portion includes an intermediate portion between the first diaphragm portion and the second diaphragm portion,
the intermediate portion is floated without contacting with the sensor substrate so as to define a space between the intermediate portion and a portion of the sensor substrate between the transmitting element and the receiving element,
an interval of the space between the intermediate potion and the portion of the sensor substrate is smaller than the interval of the gap defined between the transmitting element and the first diaphragm and between the receiving element and the second diaphragm, and
the gap defined between the transmitting element and the first diaphragm and the gap defined between the receiving element and the second diaphragm are in communication with each other through the space defined between the intermediate portion and the portion of the sensor substrate.

15. An ultrasonic sensor comprising:
an ultrasonic element configured to convert an electric signal and an ultrasonic vibration;
an element accommodation case configured to have an air-tightly and fluid-tightly sealed structure and accommodating the ultrasonic element therein; and
an interval adjustment portion configured to vary the interval between the ultrasonic element and the diaphragm portion,
wherein
the element accommodation case has a side wall portion, a bottom wall portion and a top wall portion,
the side wall portion has a tubular shape surrounding a directional central axis,
the bottom wall portion covers an end of the tubular shape of the side wall portion in a direction along the directional central axis,
the top wall portion covers an opposite end of the tubular shape of the side wall portion in the direction along the directional central axis,
the top wall portion is provided with a diaphragm portion that vibrates in the direction along the directional central axis while bending during transmission or reception of an ultrasonic wave by the ultrasonic element,
the bottom wall portion supports the ultrasonic element thereon such that the ultrasonic element is opposed to the top wall portion across a gap, and
the gap is provided such that the ultrasonic element and the diaphragm portion are opposed to each other in the direction along the directional central axis at an interval that corresponds to an integral multiple of half of a wavelength of the ultrasonic vibration.

16. The ultrasonic sensor according to claim 15, wherein the interval adjustment portion is configured to vary the interval in accordance with a change in temperature of an operation environment of the ultrasonic sensor.

17. The ultrasonic sensor according to claim 16, further comprising:
a temperature sensing portion configured to generate an output corresponding to the temperature of the operation environment, wherein
the interval adjustment portion is configured to vary the interval based on the output of the temperature sensing portion.

18. An ultrasonic sensor comprising:
an ultrasonic element configured to convert an electric signal and an ultrasonic vibration; and
an element accommodation case configured to have an air-tightly and fluid-tightly sealed structure and accommodating the ultrasonic element therein; and
an interval adjustment portion configured to vary the interval between the ultrasonic element and the diaphragm portion,
wherein
the element accommodation case has a side wall portion, a bottom wall portion and a top wall portion,
the side wall portion has a tubular shape surrounding a directional central axis,
the bottom wall portion covers an end of the tubular shape of the side wall portion in a direction along the directional central axis,
the top wall portion covers an opposite end of the tubular shape of the side wall portion in the direction along the directional central axis,
the top wall portion is provided with a diaphragm portion that vibrates in the direction along the directional central axis while bending during transmission or reception of an ultrasonic wave by the ultrasonic element,
the bottom wall portion supports the ultrasonic element thereon such that the ultrasonic element is opposed to the top wall portion across a gap,
the diaphragm portion is formed of a material having an acoustic impedance of $50 \times 10^5$ Pa·s/m or more and $5000 \times 10^5$ Pa·s/m or less, and
the diaphragm portion has a thickness of 1 mm or less,
the top wall portion has a support portion supporting an outer edge of the diaphragm portion, the support portion has a thickness greater than the diaphragm portion, and the diaphragm portion and the support portion are integral with each other.

19. The ultrasonic sensor according to claim 18, wherein the support portion has an end surface adjoining to the diaphragm portion, and the end surface of the support portion is inclined relative to the directional central axis to face the ultrasonic element.

20. The ultrasonic sensor according to claim 18, wherein the top wall portion has two diaphragm portions including the diaphragm portion, the ultrasonic element includes a transmitting element and a receiving element, the transmitting element is disposed to oppose one of the two diaphragm portions and is configured to convert the electric signal to the ultrasonic vibration, and the receiving element is disposed to oppose the other of the two diaphragm portion, and is configured to convert the ultrasonic vibration to the electric signal.

21. The ultrasonic sensor according to claim 20, wherein the transmitting element is a thermoacoustic element having a heat insulating layer and a heater disposed on the heat insulating layer, and the receiving element is a MEMS element having a vibrating part that vibrates in the direction along the directional central axis.

22. The ultrasonic sensor according to claim 18, wherein the ultrasonic element is one of a plurality of ultrasonic elements that are disposed on a sensor substrate provided by a semiconductor substrate, and the plurality of ultrasonic elements are two-dimensionally arranged in an in-plane direction intersecting with the direction along the directional central axis.

23. The ultrasonic sensor according to claim 18, wherein the ultrasonic element has a back space both sides of which in the direction along the directional central axis are closed, and a dimension of the back space in the direction along the directional central axis has a predetermined value that is ¼ or less of the wavelength of the ultrasonic vibration or an integral multiple of the predetermined value, but is different from the integral multiple of the half of the wavelength.

24. The ultrasonic sensor according to claim 18, further comprising:

a sensor substrate on which the ultrasonic element is provided, wherein the ultrasonic element includes a transmitting element and a receiving element, the diaphragm portion includes a first diaphragm portion corresponding to the transmitting element and a second diaphragm portion corresponding to the receiving element, the sensor substrate is disposed on the bottom wall portion of the element accommodation case, the sensor substrate is separated from the top wall portion and the side wall portion, the support portion includes an intermediate portion between the first diaphragm portion and the second diaphragm portion, the intermediate portion is floated without contacting with the sensor substrate so as to define a space between the intermediate portion and a portion of the sensor substrate between the transmitting element and the receiving element, an interval of the space between the intermediate potion and the portion of the sensor substrate is smaller than an interval of a gap defined between the transmitting element and the first diaphragm and an interval of a gap defined between the receiving element and the second diaphragm, and the gap defined between the transmitting element and the first diaphragm and the gap defined between the receiving element and the second diaphragm are in communication with each other through the space defined between the intermediate portion and the portion of the sensor substrate.

* * * * *